A. B. WEBB.
ENDLESS TRACK MECHANISM FOR VEHICLES.
APPLICATION FILED NOV. 17, 1919.
1,399,369.
Patented Dec. 6, 1921.
2 SHEETS—SHEET 1.
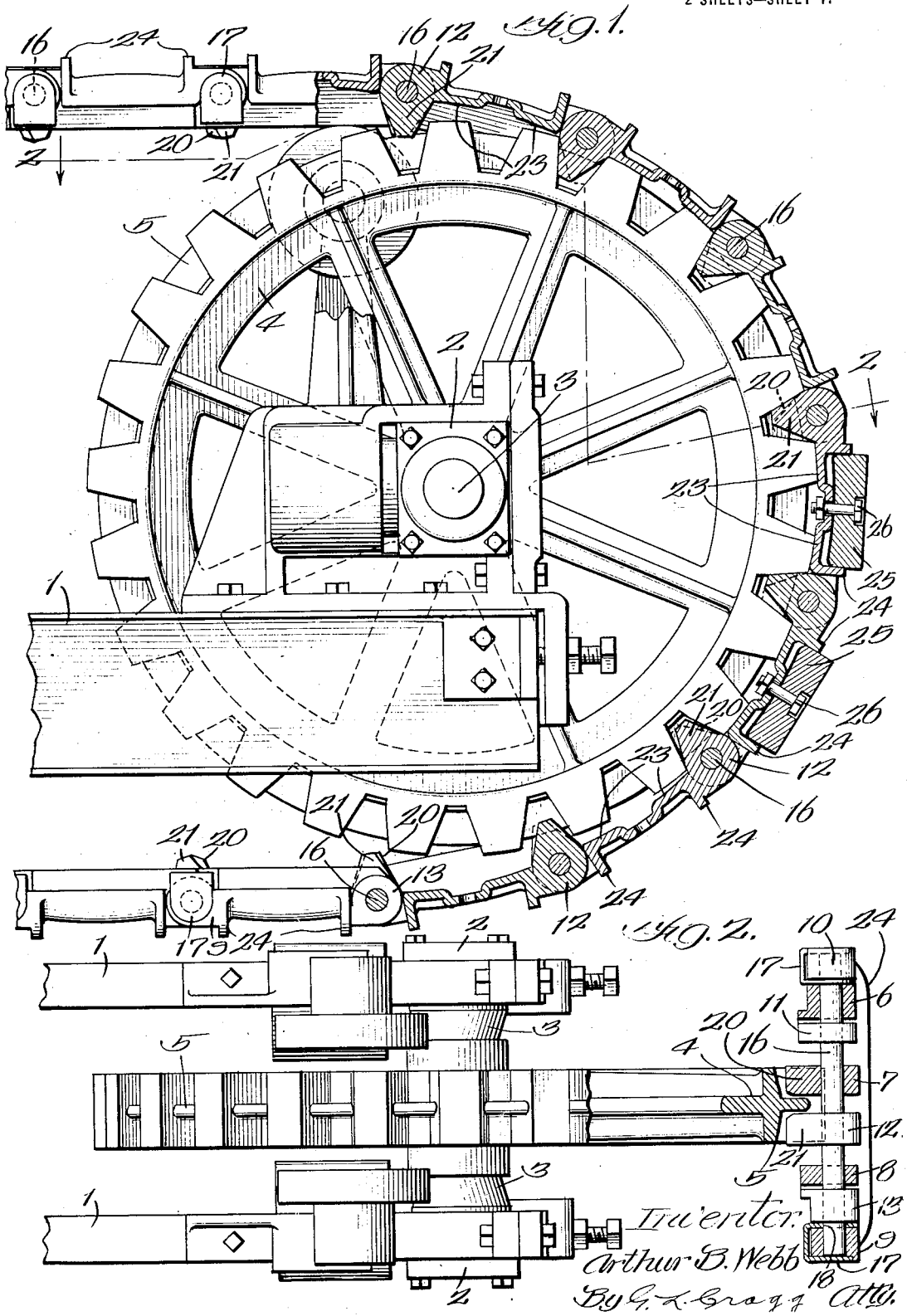

A. B. WEBB.
ENDLESS TRACK MECHANISM FOR VEHICLES.
APPLICATION FILED NOV. 17, 1919.
1,399,369.
Patented Dec. 6, 1921.
2 SHEETS—SHEET 2.
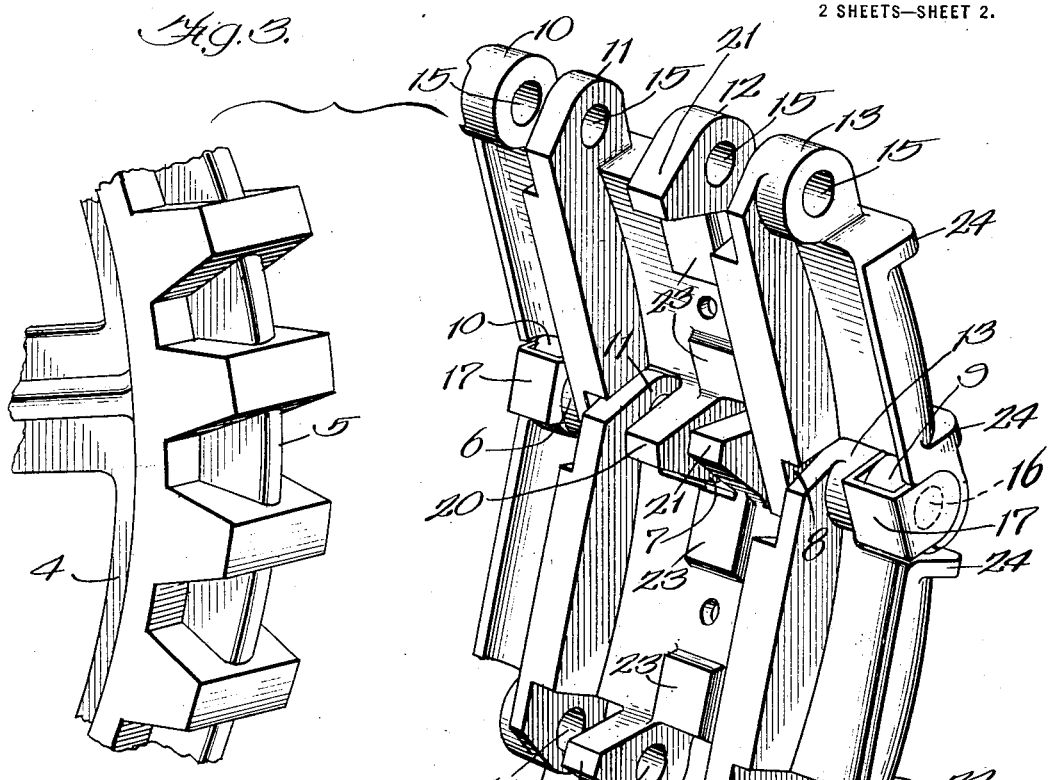
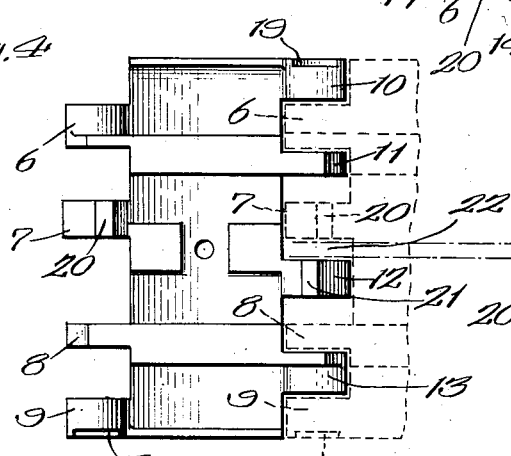
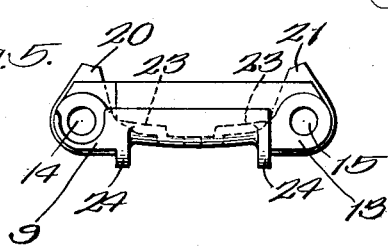
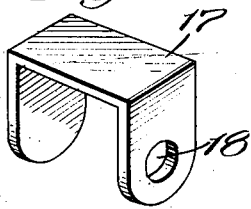
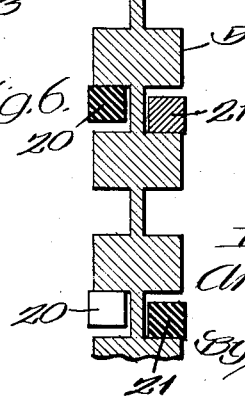
Inventor:
Arthur B. Webb
By G. L. Gragg
Atty.

UNITED STATES PATENT OFFICE.

ARTHUR B. WEBB, OF CHICAGO, ILLINOIS, ASSIGNOR TO WILLIAM N. SMITH, OF CHICAGO, ILLINOIS.

ENDLESS-TRACK MECHANISM FOR VEHICLES.

1,399,369.     Specification of Letters Patent.     Patented Dec. 6, 1921.

Application filed November 17, 1919. Serial No. 338,476.

*To all whom it may concern:*

Be it known that I, ARTHUR B. WEBB, a citizen of the United States, residing at Chicago, in the county of Cook and State of Illinois, have invented a certain new and useful Improvement in Endless-Track Mechanism for Vehicles, of which the following is a full, clear, concise, and exact description.

My invention relates to vehicles employing endless tracks and has a number of objects and advantages in view. One feature of the invention relates to those tracks employing links each having an inwardly projecting tooth upon each end thereof, one for driving engagement with the gear wheel when the track is moving in one direction and the other for driving engagement with the gear wheel when the track is moving in the reverse direction. I provide a construction whereby the tracks or the component links thereof may be reversed to double the life of the tracks and also whereby the gear wheels may be reversed to double the life of the gear wheels. I also provide rib formations upon the gear wheels for entering spaces at adjacent teeth upon the track whereby the structure is self cleaning and the track self-alining.

The invention has as another characteristic the provision of an improved construction for maintaining the assembly of the pintles that are employed for uniting adjacent links of the track whereby the pintles will not become dislodged even though they happen to be broken into sections.

In accordance with another characteristic of the invention crowns of gear wheel teeth are engaged directly with the bodies of the links between the teeth at the ends thereof to support the load, the portions of the links surrounding the places of engagement of the gear teeth crowns therewith being desirably recessed to afford passage for foreign material crushed out of place by the engagement of the gear teeeth crowns with the links.

The invention also has for its object an improved correlation therewith of blocks or fillers that may be used when the tracks are to be run over surfaces that would be apt to injure the tracks or to be injured by the grousers thereof.

All of the advantages and characteristics of my invention will be fully set forth by reference to the accompanying drawings showing the preferred embodiment thereof and in which Figure 1 is a view showing a gear wheel in elevation and a part of an endless track partially in elevation and partially in section; Fig. 2 is a sectional plan view on line 2—2 of Fig. 1; Fig. 3 is a perspective view illustrating a part of the gear wheel and a part of the endless track in separated relation; Fig. 4 is a plan view showing one of the links of the track in full lines and a contiguous link in dotted lines; Fig. 5 is a side view of a link; Fig. 6 is a view, somewhat diagrammatic, illustrating an interrelation of the gear wheel and track; and Fig. 7 is a perspective view illustrating a pintle retaining clip.

Like parts are indicated by similar characters of reference throughout the different figures.

It is understood that the endless track passes about two gear wheels, one of these gear wheels actuating the track and the other gear wheel coöperating with the first to define the orbit of the track. One of these gear wheels is illustrated in the drawings, the unillustrated gear wheel being desirably similar to the one which is illustrated.

I have illustrated a portion 1 of a truck frame which is pivotally secured between its ends to the unillustrated frame of the tractor that includes the endless tracks of my invention. This truck frame supports bearings 2 in which is journaled a shaft 3 which carries the spur gear wheel 4. The teeth of the spur gear wheel are of common formation with flat crowns. Ribs 5 are disposed between the teeth, occupying the same plane and being preferably in the mid zone of the wheel so that the teeth project equidistantly upon opposite sides thereof. The links composing the chain are preferably of the formation illustrated, each link desirably having four knuckles 6, 7, 8 and 9 at one end and four knuckles 10, 11, 12 and 13 at the other end. When the links of the endless track are assembled the knuckles 6, 7 and 8 on each link are respectively between the knuckles 10 and 11, 11 and 12, and 12 and 13 of the adjacent link, the knuckle 13 on such adjacent link being between the knuckles 8 and 9 of the contiguous link having the aforesaid knuckles 10, 11 and 12. Knuckles 6, 7, 8 and 9 on each link are provided with alined cylindrical openings 14 extending transversely of the track. Similarly, the knuckles 10, 11, 12 and 13 on each link are provided with alined cylindrical openings 15 extending transversely of the track. When the knuckles at the adjacent ends of adjacent links are interleaved, the cylindrical openings 14 and 15 therein come into alinement to permit of the passage therethrough of the pintle 16. Prior to the passage of such pintle through these openings I desirably place a pair of U-shaped clips 17 in position, the outer side of each clip being imperforate and the inner side having an opening 18. The openings 18 in the clips are alined with the alined openings 14, 15 in the knuckles. The imperforate wall of the outer clip is bent outwardly to afford clearance for the passage of the pintle whereafter this imperforate clip end is hammered into normal position. The ends of the pintle are thus confined between the imperforate sides of the U-shaped clips so that endwise displacement of such pintle is prevented and removal of parts of the pintle, in the event of the breakage of the pintle, is avoided. It is observed that one clip end only need be employed upon one side of the track at the contiguous ends of two adjacent links if the extreme opposite knuckle has the outer end of its opening closed against the outward movement of the pintle. It is also apparent that the means which I employ for preventing endwise movement of the pintle could be modified without departing from the spirit of my invention.

To prevent rocks, etc., encountered by the endless track from striking the imperforate clip sides I cause these clip sides to be received within recesses 19 in the end knuckles so that these clip sides are at least flush with the knuckles engaged thereby. Each link has two inwardly projecting teeth 20, 21 at its ends, tooth 20 springing from the root or base of knuckle 7 and tooth 21 springing from the root or base of the knuckle 12. The teeth 20 and 21 upon each link are offset corresponding to the knuckles 7 and 12 from which they extend, the arrangement being such that all of the teeth 20 are in one zone and all of the teeth 21 are in another zone. Spaces 22 intervene between adjacent zone. Spaces 22 intervene between adjacent knuckles 7 and 12, all of the spaces 22 being in a zone between the zones that contain the teeth 20 and 21. The ribs 5 are in the zone of the spaces 22.

A gear wheel tooth and but one tooth on each link and but one face of each such tooth are in driving engagement during a given direction of movement of the track and only the track teeth in one zone have such driving engagement. When the direction of movement of the track is reversed the track teeth in the other zone becomes active and the track teeth in the first zone cease to have driving engagement, the track teeth in the second zone having the same sort of coöperation with the gear wheel which the track teeth in the first zone had. With a given assembly of the parts one face of each chain tooth never has driving engagement nor do the opposing portions of the adjacent gear wheel teeth have driving engagement. When the engaged surfaces of the teeth upon the wheel and track have become sufficiently worn the wheel may be reversed upon its shaft and the track may be demounted and turned about or the links thereof may be reversed so that the previously unengaged tooth surfaces come into engaging relation to renew the life of the structure. The track teeth are desirably so interrelated that the inactive teeth are in close approximation to the gear wheel teeth so that they would engage upon reversal in the direction of travel of the track. The annular ribs 5, being confined in the space between the two zones of track teeth, have no tendency to be thrust on either side to disturb the line of travel of the track with respect to the wheel. Any foreign material in the space between the teeth, in which space said annular ribs move, would be crushed down and forced out at the base of the track.

In accordance with another feature of the invention the crowns of those teeth that are between the track teeth engage the portions of the links between the teeth thereon. In the preferred embodiment of the invention the bodies of the links are recessed to leave two raised portions 23 on each link in the zone of the wheel, these raised portions being engaged by tooth crowns, the space between these raised portions corresponding to the space between the teeth whose crowns engage the same. The spaces or recesses about the raised portions or mounds 23 accommodate foreign material that is either initially received therein or which is forced into the same by the action of the gear teeth grinding upon said mounds.

Each link has two transverse ribs 24 each at an end of the link and at the base of the knuckles there located. These ribs are what are commonly termed in the art as grousers that enter the ground to afford traction by preventing slippage of the endless tracks upon the ground. By locating these grousers at the bases of the hinge knuckles of the links such grousers serve as reinforcement of the links at the places of juncture of said knuckles with the body portions of the links. This location of the grousers also facilitates the casting of the links, the feeding of the metal flowing to the contiguous parts of the links being facilitated by such location of the grousers.

In accordance with another characteristic of my invention I provide means for extending the periphery of the endless track to remove these grousers from contact with hard floors or other surfaces into which the grousers may not readily dig so that such surfaces and grousers are protected from the injurious action of each upon the other. In carrying out this feature of my invention I employ filler blocks 25 made preferably of wood, these filler blocks being bolted to the links by means of bolts 26. In Fig. 1 of the drawing I have shown just two of such filler blocks, it being understood that each link has one of them when such has to be applied to the track for the purpose stated. The bolts 26 merely hold the wooden blocks to the track, the grousers themselves having thrusting engagement with the ends of the blocks to drive them, no reliance being placed upon the bolts for the driving action of the track upon the blocks.

The bases of the valleys between adjacent teeth of the gear wheel slope toward the axis of the gear wheel so that foreign matter received between adjacent gear teeth may readily be forced out by the action of the track teeth. In the embodiment of the invention illustrated in Figs. 1 and 2, the bottoms of these valleys slope from the mid portions at 5 in opposite directions so that the dirt or other foreign material may be exuded from both sides of the wheel. A gear wheel having this formation is not to be limited to use in a tractor, however.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following.

1. An endless track for vehicles formed of a plurality of links each having an inwardly projecting tooth at each end; in combination with a gear wheel having teeth with one of which one tooth upon a link has driving engagement when the track is moving in one direction, another tooth of said gear wheel engaging the other tooth upon the same link with the last aforesaid link tooth upon reversal in the direction of the track travel, the teeth upon similar ends of the links being arranged in one zone while the teeth upon the remaining ends of the links are arranged in another zone spaced apart from the first zone; and ribs between the teeth of the gear wheel and substantially midway between the ends of these teeth that move in the space between the aforesaid tooth zones.

2. An endless track for vehicles formed with a plurality of links each having an inwardly projecting tooth at each end; in combination with a gear wheel having teeth with one of which one link tooth has driving engagement when the track is moved in one direction and with another of which gear teeth the other tooth upon the same link with the last aforesaid link tooth has engagement upon reversal in the direction of track travel, crowns of the gear teeth being engageable with portions of the links between the teeth on the ends thereof.

3. An endless track for vehicles formed with a plurality of links each having an inwardly projecting tooth at each end; in combination with a gear wheel having teeth with one of which one link tooth has driving engagement when the track is moved in one direction and with another of which gear teeth the other tooth upon the same link with the last aforesaid link tooth has engagement upon reversal in the direction of track travel, crowns of the gear teeth being engageable with portions of the links between the teeth on the ends thereof, the links being recessed to form raised portions that are engaged with the gear teeth crowns.

4. An endless track for vehicles formed with a plurality of links each having an inwardly projecting tooth; in combination with a gear wheel having teeth engaging the track teeth, crowns of the gear teeth being engageable with portions of the links between the track teeth, the links being recessed to form raised portions that are engaged with the gear teeth crowns.

5. An endless track for vehicles including links having interleaving hinge knuckles at adjacent ends thereof, these interleaving knuckles having alined pintle receiving openings; pintles received in these alined openings; and U-shaped clips each having an inner side provided with a pintle receiving opening and an outer side sufficiently imperforate to prevent the passage therethrough of the corresponding pintle, the links being provided with recesses for receiving the outer clip sides to guard them from contact with obstacles encountered by the track.

6. An endless track for vehicles including links having interleaving hinge knuckles at adjacent ends thereof, these interleaving knuckles having alined pintle receiving openings; pintles received in these alined openings; and U-shaped clips each having an inner side provided with a pintle receiving opening and an outer side sufficiently imperforate to prevent the passage therethrough of the corresponding pintle.

In witness whereof, I hereunto subscribe my name this 12th day of November, A. D. 1919.

ARTHUR B. WEBB.